Patented Feb. 6, 1940

2,189,720

UNITED STATES PATENT OFFICE 2,189,720

VULCANIZATION OF RUBBER

George W. Watt, Akron, Ohio, assignor to Wingfoot Corporation, Wilmington, Del., a corporation of Delaware No Drawing. Application October 24, 1936, Serial No. 107,465

18 Claims. (Cl. 260—788)

This invention relates to improvements in the vulcanization of rubber and, more particularly, to a new class of rubber vulcanization accelerators. It includes the products of the process.

Heretofore it has been found that the 2-mercaptothiazoles and a number of their derivatives in which the hydrogen of the mercaptan group is replaced by an organic group are valuable rubber vulcanization accelerators. Many of these mercaptothiazole derivatives are delayed action accelerators and are used most successfully in rubber compositions in which an activating accelerator of basic nitrogen-containing type is employed.

This invention involves the discovery of a new class of compounds which are excellent accelerators. Some of them may be employed either by themselves or in conjunction with basic activators. Others are such powerful accelerators that the presence of an activator is not desirable, while still others are preferably used in conjunction therewith. The new accelerators are reaction products of thiuronium halides and water soluble salts of 2-mercapto- or 2-selenyl-thiazoles or selenazoles. In most cases, they appear to be definite chemical compounds but their exact constitution is not known. They are illustrated by one of the three following formulae, it not being known to which, if any, of these formulae the compounds actually conform:

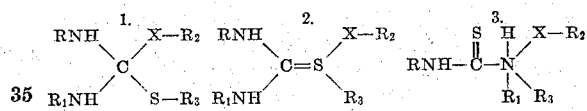

In these formulae, R and R₁ may be hydrogen or alkyl, aralkyl, alicyclic, aryl groups or substitution products thereof. They also may be like or unlike radicals. R₂ is an aryl thiazyl radical, such as the benzothiazyl, 6-nitro benzothiazyl and naphthothiazyl radicals, or an aryl selenazyl radical, such as benzoselenazyl, 6-ethoxy benzoselenazyl and naphthoselenazyl radicals. R₃ is an organic radical such as alkyl, alicyclic, aralkyl, carboxy alkyl, and aromatic acyl radicals. X is sulphur or selenium.

The accelerators of the invention are conveniently prepared by bringing the desired thiuronium halide into reaction with an alkali metal, or other water soluble salt of a 2-mercapto aryl thiazole, of a 2-mercapto aryl selenazole, of a 2-selenyl aryl thiazole, or of a 2-selenyl aryl selenazole. Alkali halide is eliminated and the new chemical products are formed. The reaction is preferably carried out in solution, convenient solvents being water, alcohol and acetone and mixtures of the same. Although not necessary, it is generally preferable to conduct the reaction at a temperature in the neighborhood of 0–10° C. Also, as will be apparent hereafter, it is not necessary to employ a previously isolated thiuronium halide, but the water soluble salt of the mercaptan or of the selenyl compound may be added to the liquid containing the thiuronium halide just after the formation of the latter.

The thiuronium halides are well known compounds, many examples of which have been described in the literature (see for example, Werner, J. Chem. Soc. 57, 283–304; Lecher & Hueck, Annalen, 438, 169–184; and Donleavy, J. Amer. Chem. Soc. 58, 1004–1005). Such compounds are formed when thiourea or substituted thioureas are permitted to react with organic halides. Illustrative are S-benzyl thiuronium chloride, S-(o-, m-, or p-methyl benzyl) thiuronium chloride, S-(carboxy methyl) thiuronium chloride, S-n-butyl thiuronium bromide, S-benzyl N-cyclohexyl thiuronium chloride, S-methyl thiuronium chloride, S-ethyl thiuronium iodide, S-(carbethoxy methyl) thiuronium chloride, S-allyl thiuronium bromide, S-benzyl N-methyl thiuronium chloride, S-benzyl N-N'-dicyclohexyl thiuronium chloride, etc. Other thioureas which may be employed to form the thiuronium halides are mono para ethoxy cyclohexyl thiourea, mono hexa hydro o- or p-tolyl thiourea, mono xylyl thiourea, mono methyl thiourea, mono ethyl thiourea, N-N' diethyl thiourea, mono butyl thiourea, di-N-N'-(p-methoxy cyclohexyl) thiourea, etc. Other organic halides which may be employed are n-heptyl bromide, n-amyl bromide, n-propyl bromide, hexahydro benzyl chloride, o-, m- or p-nitro benzyl chloride, para chlor benzyl chloride, o-, m- or p-ethoxy benzyl chloride, o-methoxy benzyl chloride, mono halogenated aliphatic carboxylic acids, such as alpha chlor propionic acid and alpha brom butyric acid, alpha chlor ethyl propionate, alpha brom methyl butyrate, chlor methyl acetate, chlor butyl acetate, chlor propyl acetate, dichlor acetic acid, and the like.

Any 2-mercapto aryl thiazole, 2-mercapto aryl selenazole, 2-selenyl arylthiazole or 2-selenyl aryl selenazole may be employed in preparing the accelerators of the invention, preferably in the form of an alkali metal, or other water soluble salt such as the sodium, potassium and ammonium salts. The free mercaptan and free selenyl compounds may be represented by the following formula:

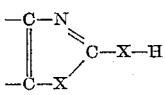

wherein the X's each may be either sulphur or selenium and the two adjacent carbon atoms of the azole ring form part of an arylene ring. Illustrative of the mercapto aryl thiazoles are 2-mercaptobenzothiazole, 2-mercapto 6-nitro benzothiazole, 6-chlor 2-mercapto benzothiazole, 2-mercapto 4-phenyl benzothiazole, 2-mercapto 4-methyl benzothiazole, 6-ethoxy 2-mercapto benzothiazole, 2-mercapto 6-methoxy benzothiazole, 6-chlor 2-mercapto 5-nitro benzothiazole, 6-hydroxy 2-mercapto benzothiazole, the 2-mercapto alpha and beta naphthothiazoles, and other alkyl-, aryl-, nitro-, amino-, hydroxy-, halo-, and alkoxy-substituted 2-mercapto arylene thiazoles of the benzene and naphthalene series. The corresponding 2-mercapto aryl selenazoles, 2-selenyl aryl thiazoles and 2-selenyl aryl selenazoles are illustrative examples of such compounds.

The 2-selenyl aryl thiazoles employed in preparing accelerators of the invention may be made according to the following process illustrating the preparation of 2-selenyl benzothiazole. To an aqueous solution containing 0.4 mol of sodium selenide ($Na_2Se$) are added 67.8 parts (0.4 mol) of 2-chlor benzothiazole and with rapid stirring the reaction mixture is heated to gentle reflux. The mixture is maintained at gentle ebullition for a period of from 30 to 45 minutes or until droplets of the 2-chlor benzothiazole disappear in the reflux. The solution then contains the 2-selenyl benzothiazole in the form of its sodium salt, the equation for the reaction being as follows:

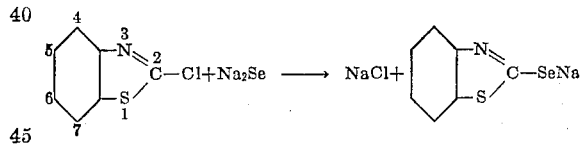

The 2-selenyl benzothiazole is then precipitated from the solution of its sodium salt with an acidifying agent, such as hydrochloric or sulphuric acid. The product, 2-selenyl benzothiazole, is a slightly yellow, crystalline powder which melts with decomposition at 140–143° C. Other 2-selenyl thiazoles may be prepared similarly by employing the corresponding 2-chlor thiazole instead of 2-chlor benzothiazole.

The 2-selenyl aryl selenazoles may be prepared according to the process of the preceding paragraph by replacing the 2-chlor benzothiazole with 2-chlor benzoselenazole or any other desired 2-chlor aryl selenazole. 2-selenyl benzoselenazole is a light yellow crystalline powder which melts with decomposition at 152–153° C.

The preparation of the 2-mercapto aryl selenazoles is illustrated by that of 2-mercaptobenzoselenazole. 25 grams of sodium hydroxide are dissolved in one liter of water and the solution is then saturated with hydrogen selenide. To this is added 0.5 mol of ortho nitro chlor benzene and the mixture brought to boiling with rapid agitation. One mol of sodium hydroxide is added and hydrogen sulphide gas is passed into the mixture. The mixture is then cooled down to a temperature of about 40° C., whereupon 90 cc. of carbon bisulphide are added. The temperature thereafter is gradually raised so that the carbon bisulphide refluxes. After a few hours the mixture is cooled and the resulting sodium benzoselenazyl mercaptide is treated in solution with an acid such as hydrochloric acid or sulphuric acid, whereupon 2-mercaptobenzoselenazole precipitates. The product melts at 160–161° C. and is a yellow powder. The equations believed to substantially represent the reaction are as follows:

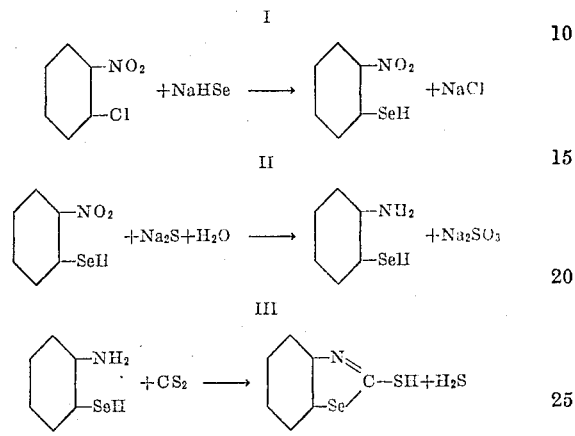

By replacing the ortho nitro chlor benzene of the example with other ortho nitro chlor benzene compounds, such as ortho nitro chlor para toluene, ortho nitro chlor para methoxy benzene, 2-4-dinitro chlor benzene, ortho nitro chlor diphenyl, alpha chlor beta nitro naphthalene, etc., the corresponding 2-mercapto arylene selenazoles may be prepared. These 2-mercapto selenazoles may also be prepared as described in the Journal for the Society of Chemical Industry (1935), page 1765.

Further illustrative of the invention are the following examples which are to be understood as illustrative only and not limitative thereof.

*Example 1*

What is called for convenience S-benzyl thiuronium 2-benzothiazyl sulphide was prepared as follows: 30.5 parts by weight of S-benzyl thiuronium chloride were dissolved in 500 parts of water, cooled to 50° C. and stirred. To this solution was added dropwise and with constant stirring a solution of 28.4 parts by weight of sodium benzothiazyl mercaptide in 500 parts of water. The resulting white precipitate was filtered off, washed with water and dried, an approximate 90% yield being obtained. Upon purifying the product by dissolving it in alcohol and reprecipitating it by addition of water followed by cooling in an ice bath, it was found that the resulting white crystals melted at 111–112° C. The nitrogen and sulphur analyses of this product were 12.74% nitrogen and 28.60% sulphur. The theoretical nitrogen and sulphur contents for

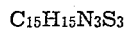
$$C_{15}H_{15}N_3S_3$$

are 12.59% and 28.78%, respectively. The formula is assumed to be

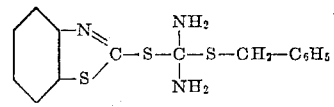

although it may conform to one of the other two formulae previously described.

*Example 2*

The product described in Example 1 may also be prepared by dissolving 7.6 parts by weight of thiourea in 100 parts of water and treating with 12.6 parts by weight of benzyl chloride. 50 parts of alcohol were then added and the mixture warmed until all of the benzyl chloride had dissolved. The reaction mixture is then cooled to 5° C. and treated, as described in Example 1, with 18.9 parts of the sodium salt of 2-mercaptobenzothiazole dissolved in 100 parts of water. S-benzyl thiuronium 2-benzothiazyl sulphide was isolated in a 87% yield.

*Example 3*

The products of the invention may also be prepared by conducting the reaction at room temperature, although generally the yields are somewhat lower. Thus, 7.6 parts of thiourea and 12.6 parts of benzyl chloride were warmed in 100 parts of water and 50 parts of ethyl alcohol until all of the benzyl chloride dissolved. The resulting solution was cooled to 30° C. and treated slowly and with stirring with 18.9 parts of sodium benzothiazyl 2-mercaptide dissolved in 50 parts of water. The product formed was a yellow viscous oil which crystallized before addition of the sodium salt solution was completed. Pale yellow crystals were isolated as described in the foregoing examples, a 77% yield being obtained.

*Example 4*

S-(carboxy methyl) thiuronium 2-benzothiazyl sulphide was prepared as follows: 34.1 parts by weight of S-carboxy methyl thiuronium chloride (from thiourea and chlor acetic acid) were dissolved in 500 parts of water, stirred, cooled to 5° C., and treated with a solution of 37.8 parts of sodium benzothiazyl mercaptide in 500 parts of water. The resulting solid product was treated as described in Example 1 and was obtained in the yield of 87%. The product softened at a temperature above 162° C. and melted with decomposition between 200° C. and 210° C. The following formula illustrates the probable composition of the product:

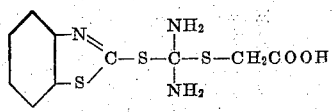

*Example 5*

S-n-butyl thiuronium 2-benzothiazyl sulphide was prepared by dissolving 21.3 parts by weight of S-n-butyl thiuronium bromide in 200 parts of water, cooling to 0° C., and treating with an aqueous solution of 18.9 parts of sodium benzothiazyl mercaptide. The resulting precipitate was filtered off, washed with cold water and air dried. A 94% yield was obtained. The product melted at 107–108° C. and analyzed 14.20% nitrogen and 31.71% sulphur. The calculated nitrogen and sulphur contents for $C_{12}H_{17}N_3S_3$ are 14.05% and 32.11%, respectively. The probable formula is assumed to be:

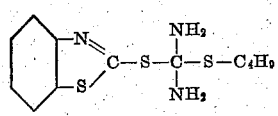

*Example 6*

10.8 parts of S-benzoyl thiuronium chloride (from benzoyl chloride and thiourea) were dissolved in 100 parts of water, cooled to 5° C., stirred vigorously and treated with an aqueous solution of 9.5 parts of sodium benzothiazyl mercaptide in 50 parts of water. The resulting white precipitate was filtered off, washed with water and dried. It melted at 106–108° C.

*Example 7*

The reaction product of S-benzyl-sym.-diphenylthiuronium chloride and the sodium salt of 2-mercaptobenzothiazole was prepared by dissolving in 100 cc. of ethyl alcohol 35.5 grams of S-benzyl-sym.-diphenyl thiuronium chloride (the addition compound formed from sym.-diphenyl thiourea and benzyl chloride) and adding to this solution 18.9 grams of the sodium salt of 2-mercaptobenzothiazole in 100 cc. of ethyl alcohol. The reaction mixture was heated to boiling on a water bath, and then poured in 1000 cc. of ice water. The gummy yellow product which separated was triturated with benzene, filtered and the benzene allowed to evaporate at room temperature. The clear amber colored oil which remained upon complete volatilization of the benzene was the product.

*Example 8*

⅕ mol of S-allyl thiuronium bromide (from allyl bromide and thiourea) was dissolved in 250 cc. of water, stirred, cooled to 0° C. and treated with a solution of ⅕ mol of the sodium salt of 2-mercaptobenzothiazole in 250 cc. of water at 0° C. The resulting precipitate was filtered off, washed with water and dried in the air. A quantitative yield of the product of S-allyl thiuronium 2-benzothiazyl sulphide, which melted at 56–59° C. was obtained. The probable formula is assumed to be

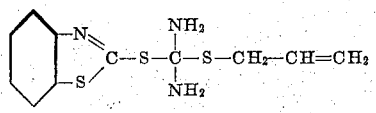

*Example 9*

1/10 mol of S-benzyl thiuronium chloride was dissolved in 100 cc. of water, stirred, cooled to 0° C. and treated with a solution of 1/10 mol of the sodium salt of 2-mercaptobenzoselenazole in 100 cc. of water. The resulting white precipitate was filtered, washed with water and air dried. A quantitative yield of product, S-benzyl thiuronium 2-benzoselenazyl sulphide, melting at 107–109° C., was obtained. The formula is assumed to be

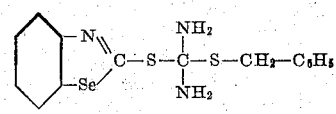

*Example 10*

S-benzyl thiuronium 2-benzothiazyl selenide was prepared according to the procedure of Example 9 except that the reactants were 20.3 parts of S-benzyl thiuronium chloride and 23.6 parts of the sodium salt of 2-selenyl benzothiazole. The product, a white solid melting at 127–128° C., was obtained in a 100% yield. The probable formula is

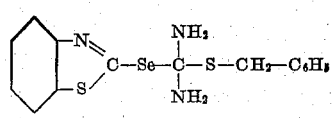

The reaction products of thiuronium halides and alkali metal salts of 2-mercapto aryl thiazoles, of 2-mercapto aryl selenazoles, of 2-selenyl aryl thiazoles or of 2-selenyl aryl selenazoles have been found to be very good rubber vulcanization accelerators. Illustrative of their use in rubber is the following formula:

| | Parts by weight |
|---|---|
| Smoked sheet rubber | 100 |
| Zinc oxide | 5 |
| Sulphur | 3 |
| Accelerator | As indicated |

Results obtained by the use of representative accelerators of the invention in the above formula are as follows, the figures given being those for the optimum cure in the range tested as determined by hand tests.

| Accelerator | Amt. | Cure in minutes at °F. | Tens. kgs./cm². | Ult. elg., percent | Modulus 500% | Modulus 700% |
|---|---|---|---|---|---|---|
| S-benzyl thiuronium 2-benzothiazyl sulphide. | .50 | 40/260 | 118 | 825 | 17 | 55 |
| S-benzyl thiuronium 2-benzothiazyl sulphide. | .35 | | | | | |
| Diphenylguanidine | .15 | 20/260 | 128 | 810 | 19 | 67 |
| S-carboxy methyl thiuronium 2-benzothiazyl sulphide. | .50 | 80/260 | 109 | 800 | 18 | 58 |
| S-carboxy methyl thiuronium 2-benzothiazyl sulphide. | .35 | | | | | |
| Diphenylguanidine | .15 | 20/260 | 126 | 810 | 19 | 66 |
| S-n-butyl thiuronium 2-benzothiazyl sulphide. | .50 | 30/240 | 165 | 815 | 24 | 85 |
| 2-mercaptobenzothiazole. | .50 | 40/260 | 136 | 820 | 20 | 67 |
| S-allyl thiuronium 2-benzothiazyl sulphide. | .50 | 30/260 | 136 | 810 | 21 | 75 |
| S-benzyl thiuronium 2-benzoselenazyl sulphide. | .50 | 30/260 | 149 | 820 | 21 | 73 |
| S-benzoyl thiuronium 2-benzothiazyl selenide. | .50 | 40/260 | 126 | 790 | 22 | 76 |

It will be apparent that the accelerators of the invention are adapted for use in many rubber products. They accelerate the vulcanization of rubber at fairly low temperatures and have a good curing range. Although it is not desirable in all cases, many of them may be used in conjunction with basic nitrogen-containing accelerators of which diphenylguanidine is merely illustrative. Others are diortho tolyl guanidine, benzyl amine, 2-4-diamino diphenylamine, p-p'-diamino diphenyl methane, diphenylguanidine neutral phthalate, diphenylguanidine neutral succinate, urea, urea succinate, and the like. Comparative testing data for the commercial accelerator, 2-mercaptobenzothiazole, is presented, which further shows the excellent accelerative properties of the compositions of the invention.

It is intended that the patent shall cover, by suitable expression in the appended claims, whatever features of patentable novelty reside in the invention.

What I claim is:

1. S-benzyl thiuronium 2-benzothiazyl sulphide.
2. S-carboxymethyl thiuronium 2-benzothiazyl sulphide.
3. S-n-butyl thiuronium 2-benzothiazyl sulphide.
4. The process of accelerating the vulcanization of rubber which comprises vulcanizing the same in the presence of a thiuronium 2-arylenethiazyl sulphide.
5. The process of accelerating the vulcanization of rubber which comprises vulcanizing the same in the presence of a thiuronium 2-benzothiazyl sulphide.
6. The process of accelerating the vulcanization of rubber which comprises vulcanizing the same in the presence of a compound selected from the group consisting of thiuronium 2-arylene thiazyl sulphides, thiuronium 2-arylene selenazyl sulphides, thiuronium 2-arylene selenazyl selenides, and thiuronium 2-arylene thiazyl selenides.
7. The process of accelerating the vulcanization of rubber which comprises vulcanizing the same in the presence of S-benzyl thiuronium 2-benzothiazyl sulphide.
8. The process of accelerating the vulcanization of rubber which comprises vulcanizing the same in the presence of S-n-butyl thiuronium 2-benzothiazyl sulphide.
9. The process of accelerating the vulcanization of rubber which comprises vulcanizing the same in the presence of S-carboxymethyl thiuronium 2-benzothiazyl sulphide.
10. The process of accelerating the vulcanization of rubber which comprises vulcanizing the same in the presence of an S-alkyl thiuronium 2-arylene thiazyl sulphide.
11. The process of accelerating the vulcanization of rubber which comprises vulcanizing the same in the presence of an S-carboxyalkyl thiuronium 2-arylene thiazyl sulphide.
12. The vulcanizates obtainable according to the process of claim 4.
13. The vulcanizates obtainable according to the process of claim 6.
14. As new compositions of matter, the thiuronium 2-benzothiazyl sulphides.
15. A compound selected from the group consisting of thiuronium 2-arylene thiazyl sulphides, thiuronium 2-arylene selenazyl sulphides, thiuronium 2-arylene selenazyl selenides, and thiuronium 2-arylene thiazyl selenides.
16. As new compositions of matter, the thiuronium 2-arylene thiazyl sulfides.
17. As new compositions of matter, the S-alkyl thiuronium 2-arylene thiazyl sulfides.
18. As new compositions of matter, the S-carboxy alkyl thiuronium 2-arylene thiazyl sulfides.

GEORGE W. WATT.